No. 748,730.

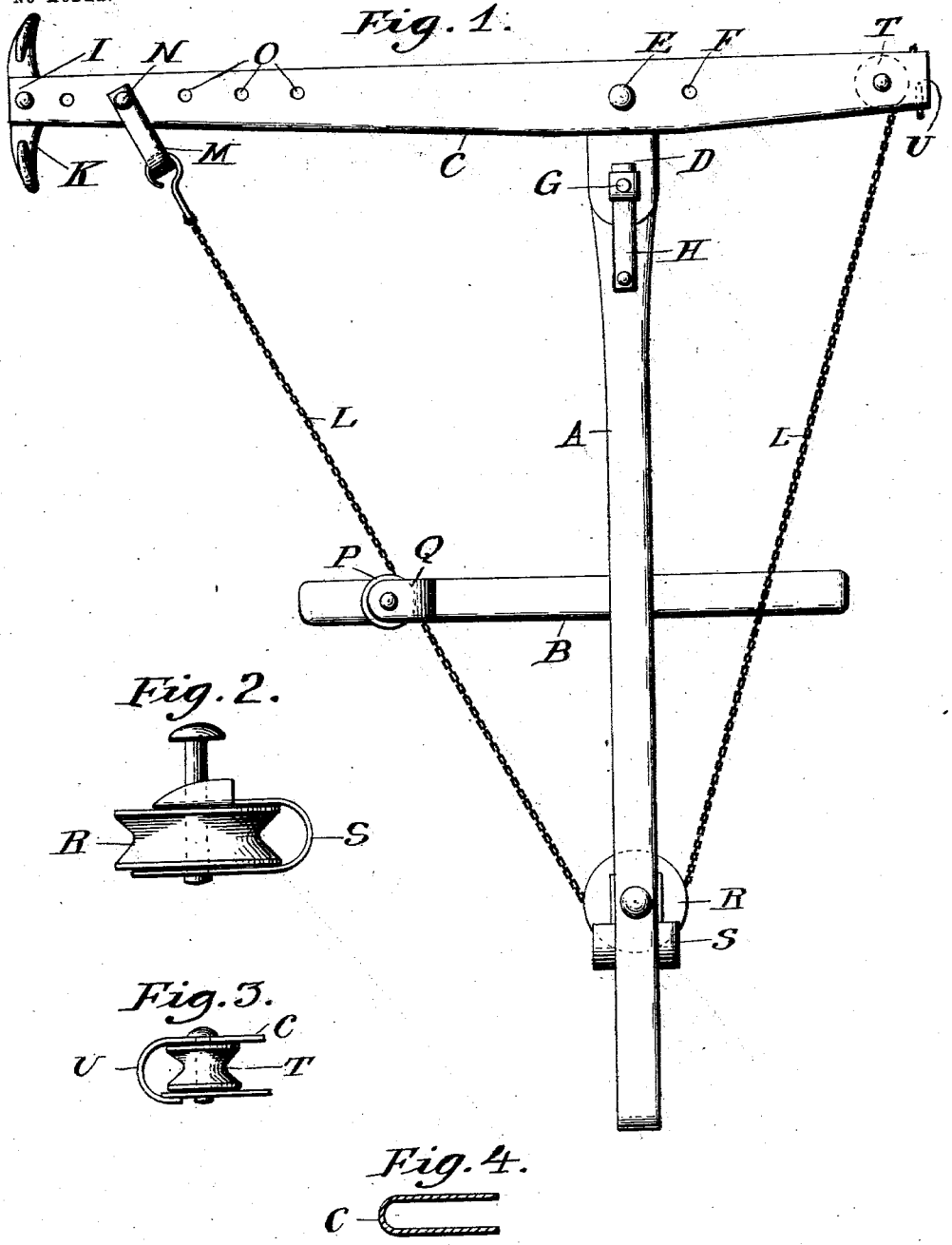

Patented January 5, 1904.

UNITED STATES PATENT OFFICE.

JEFFERSON B. HAYDEN, OF ABILENE, TEXAS.

DRAFT-EQUALIZER.

SPECIFICATION forming part of Letters Patent No. 748,730, dated January 5, 1904.

Application filed April 21, 1903. Serial No. 153,600. (No model.)

*To all whom it may concern:*

Be it known that I, JEFFERSON B. HAYDEN, a citizen of the United States, residing at Abilene, in the county of Taylor and State of Texas, have invented certain new and useful Improvements in Draft-Equalizers, of which the following is a specification.

My invention relates to devices for equalizing the draft where several animals are employed, the invention relating especially to equalizers to be attached to plow-beams, and has for its object to provide means by which side draft is avoided, said means consisting of a sheave or drum on the plow-beam around which is carried a chain or cable connecting one end of a spreader-bar pivoted at the front of the beam with the animal or animals opposite the other end of the spreader-bar, the last-mentioned end of the spreader-bar having a sheave or drum journaled therein over which the chain or cable works.

The advantages of my invention will appear hereinafter and by reference to the accompanying drawings, in which—

Figure 1 is a top plan view of a portion of a plow beam and axle, showing my improved draft-equalizing apparatus applied thereto; Fig. 2, a detail view of the pulley attached to the plow-beam; Fig. 3, a detail view of one end of the equalizing-lever, and Fig. 4 a cross-section of the equalizing-lever.

Referring to the drawings, in which similar reference characters indicate corresponding parts throughout the several views, A represents the plow-beam of a sulky-plow, and B the axle.

C represents the equalizing-lever, which is made, preferably, of sheet metal bent to form a U shape in cross-section, as shown in Fig. 4, which is pivoted to the end of the beam A by means of plate D, secured to the lever C by means of pin or bolt E, passing through one of the holes F in said lever and a hole in said plate D. The other end of said plate is pivotally mounted on the end of beam A by means of bolt G, passing through said beam, a hole in said plate, and through retaining-strap H, pivoted on the top of beam A. One end of lever C is split and has pivoted between the two tongues I, formed thereby, a double-ended hook K, the front hook thereof being to receive the whiffletree, to which two or more animals are hitched, while the rear end may be used to receive one end of draft-chain L, if desired, though it is generally attached to the beam by means of a U-shaped clip M, secured to the beam by means of pin or bolt N, passing through one of the holes O in the beam and holes in the ends of said clip. The chain L passes around sheave or pulley P, journaled in a boxing Q, secured on the axle B, then around sheave or pulley R, journaled in boxing S, secured to beam A, and then around pulley T, journaled in the end of lever C, said end of the lever being split and bent around said pulley, so as to form a boxing U, as shown. The end of chain L is provided with a hook, link, or other suitable attaching device to secure a whiffletree thereto.

The operation of my invention will readily appear from the above description and by reference to the drawings.

It will be understood that the number of animals to be attached to the plow may be varied at will by changing the position of the bolt E, transferring it to the various holes F, and by varying the position of clip M by securing it to the beam at the different holes O.

Having thus described my invention, what I claim is—

1. In a draft-equalizer, a beam, a sheave journaled on said beam, an equalizing-lever made of sheet metal bent to a U shape in cross-section pivoted on said beam, a draft-hook pivoted at one end of said lever, a pulley journaled at the other end, and a draft-chain transposably secured to the hook end of the lever and passing loosely around the sheave on the beam and then around the pulley in the end of the lever, substantially as shown and described.

2. In a draft-equalizer, a beam, a sheave journaled on said beam, an equalizing-lever made of sheet metal and bent to a U shape in cross-section, a plate transposably secured to said lever and pivoted on said beam, a hook pivoted at one end of said lever, a pulley journaled in the other end, and a draft-chain transposably secured to the hook end of the lever and passing loosely around the sheave on the beam and then around the pulley in the end of the lever, substantially as shown and described.

3. In a draft-equalizer, a beam, a sheave journaled on said beam, an equalizing-lever made of sheet metal and bent to a U shape in cross-section, a plate transposably secured to said lever and pivoted on said beam, one end of said lever split and a double-ended hook pivoted therebetween, the other end of the lever also split, a pulley journaled between the two split ends, the extended portion of one of said split ends bent to form a guide around said pulley, and a draft-chain transposably secured to the hook end of the lever and passing loosely around the sheave on the beam and then around the pulley in the end of the lever, substantially as shown and described.

In testimony whereof I hereto affix my signature in the presence of two witnesses.

JEFFERSON B. HAYDEN.

Witnesses:
 TAYLOR McRAE,
 C. L. HAILEY.